(12) United States Patent
Kienzle et al.

(10) Patent No.: US 8,357,320 B2
(45) Date of Patent: Jan. 22, 2013

(54) PROCESS FOR THE IMPREGNATION OF CARBON FIBER BUNDLES, RESIN-IMPREGNATED CARBON FIBER BUNDLE, SHAPED BODY AND INTERMEDIATE BODY FOR SILICIZATION

(75) Inventors: Andreas Kienzle, Möttingen/Balgheim (DE); Ingrid Krätschmer, Biberbach (DE)

(73) Assignee: SGL Carbon SE, Wiesbaden (DE)

( * ) Notice: Subject to any disclaimer, the term of this patent is extended or adjusted under 35 U.S.C. 154(b) by 1653 days.

(21) Appl. No.: 11/786,278

(22) Filed: Apr. 11, 2007

(65) Prior Publication Data
US 2007/0237954 A1 Oct. 11, 2007

(30) Foreign Application Priority Data

Apr. 11, 2006 (EP) ..................................... 06007562

(51) Int. Cl.
*B29C 67/00* (2006.01)
*G11B 9/00* (2006.01)
*B32B 29/02* (2006.01)
*D04H 1/00* (2006.01)

(52) U.S. Cl. .................. 264/136; 428/293.1; 428/292.1; 428/338; 428/375

(58) Field of Classification Search ........................ None
See application file for complete search history.

(56) References Cited

U.S. PATENT DOCUMENTS

| | | | | |
|---|---|---|---|---|
| 4,026,998 A | | 5/1977 | Jorro et al. ..................... 423/470 |
| 5,242,746 A | | 9/1993 | Bommier et al. .............. 442/247 |
| 6,261,981 B1 * | | 7/2001 | Dietrich et al. ............... 501/95.2 |
| 6,627,312 B1 | | 9/2003 | Behr et al. ..................... 428/367 |
| 6,641,693 B2 * | | 11/2003 | Guckert et al. ................ 156/171 |
| 2006/0076699 A1 | | 4/2006 | Domagalski et al. ......... 264/29.2 |

FOREIGN PATENT DOCUMENTS

| | | |
|---|---|---|
| DE | 198 61 035 A1 | 10/1999 |
| EP | 1 514 858 A2 | 3/2005 |
| EP | 1 645 671 A1 | 4/2006 |
| GB | 1 343 773 | 1/1974 |

* cited by examiner

*Primary Examiner* — Camie Thompson
(74) *Attorney, Agent, or Firm* — Laurence A. Greenberg; Werner H. Stemer; Ralph E. Locher

(57) ABSTRACT

A process for the impregnation of carbon fiber bundles enables the carbon fiber bundles to be impregnated with a curable liquid resin without the impregnated fiber bundles sticking together. The fiber bundles are present in a mechanically generated fluidized bed during the impregnation and are held in the fluidized bed until the resin has been cured or at least dried. A resin-impregnated carbon fiber bundle, a shaped body and an intermediate body for silicization are also provided.

22 Claims, No Drawings

PROCESS FOR THE IMPREGNATION OF CARBON FIBER BUNDLES, RESIN-IMPREGNATED CARBON FIBER BUNDLE, SHAPED BODY AND INTERMEDIATE BODY FOR SILICIZATION

CROSS-REFERENCE TO RELATED APPLICATION

This application claims the priority, under 35 U.S.C. §119, of European Patent Application EP 06 007 562.9, filed Apr. 11, 2006; the prior application is herewith incorporated by reference in its entirety.

BACKGROUND OF THE INVENTION

Field of the Invention

The present invention relates to a process for the impregnation of carbon fiber bundles with a curable liquid resin. The invention also relates to a resin-impregnated carbon fiber bundle, a shaped body and an intermediate body for silicization.

Carbon fiber reinforced silicon carbide (C/SiC) is produced by silicization of intermediate bodies including a carbon matrix with carbon fibers embedded therein. In such a case, it is absolutely crucial to avoid direct contact between the carbon fibers and the infiltrated silicon, since otherwise the carbon fibers are converted into silicon carbide with a loss of their reinforcing action. That can be avoided by surrounding the carbon fibers or fiber bundles in the intermediate body with a dense envelope of "sacrificial carbon" or filling the hollow spaces in the fiber bundles with sacrificial carbon. The sacrificial carbon binds the silicon which has not reacted with the carbon matrix before it can penetrate through to the carbon fibers.

A process for producing a composite which is reinforced by short carbon fibers (especially graphite fibers) and has a matrix including silicon carbide as well as elemental carbon and silicon, in which the carbon fibers have been provided with a multilayer carbon envelope by multiple impregnation with a carbonizable impregnant and subsequent carbonization, is known from European Patent EP 0 864 548, corresponding to U.S. Pat. No. 6,030,913. That process includes the following steps:
a) pressing together of at least two layers of a prepreg including high-strength graphite fibers and a carbonizable resin and curing of a body obtained by the pressing together,
b) carbonization of the body obtained in process step a),
c) impregnation of the porous body obtained in process step b) with a carbonizable impregnant at least once and then carbonization of the impregnated body,
d) graphitization of the body obtained in process step c),
e) comminution of the graphite body obtained in process step d),
f) mixing of at least part of the milled material obtained in process step e) with a carbon-containing binder from the group consisting of synthetic resins, pitches, mixtures of synthetic resins and pitches,
g) pressure molding and curing of the mixture obtained in process step f),
h) carbonization of the shaped body obtained in process step g), and
i) infiltration of the porous body obtained in process step h) with liquid silicon and conversion of the carbon matrix of the body into silicon carbide with retention of short graphite fibers present in the body.

In step a), sheets ("layers") including carbon fibers and a resin are firstly produced. Those "layers" are textile sheets such as woven fabrics. A body is then produced from the sheets and is multiply impregnated and carbonized. That body is only an intermediate in the production of the short carbon fibers provided with a carbon envelope. The short carbon fibers are obtained by comminution (milling) of that body. A molding composition is then produced from the milled material and a carbonizable matrix former (referred to as a binder in step f)) and the body to be silicized is formed from that molding composition.

The process described above is relatively complicated since a body is firstly produced from the carbon fibers to be impregnated and that body has to be comminuted again after impregnation and carbonization in order to obtain a short fiber bundle coated with a carbon envelope which will withstand silicization. There is therefore a need for a process which makes it possible to provide short fiber bundles of carbon fibers directly with such a carbon envelope without the circuitous route through production of a body.

If carbon fiber bundles are impregnated with an impregnant, for example a resin, it is not possible to prevent the impregnated bundles from sticking together as a result of the impregnant adhering to their surface. The result is therefore not individual impregnated bundles but a lump-like resin-impregnated accumulation of fibers which cannot readily be broken up into individual fiber bundles again. The accumulation could only be broken up after curing or carbonization, but that would result in damage to the fiber bundles.

SUMMARY OF THE INVENTION

It is accordingly an object of the invention to provide a process for the impregnation of carbon fiber bundles, a resin-impregnated carbon fiber bundle, a shaped body and an intermediate body for silicization, which overcome the hereinafore-mentioned disadvantages of the heretofore-known processes and products of this general type and which make it possible to impregnate carbon fiber bundles with a curable liquid resin without the impregnated fiber bundles sticking together.

With the foregoing and other objects in view there is provided, in accordance with the invention, a process for the impregnation of bundles of carbon fibers with a curable resin present in liquid form. According to the process, the carbon fiber bundles are present in a mechanically generated fluidized bed during impregnation with the curable resin. The carbon fiber bundles are kept in the fluidized bed until the resin has been cured or at least dried so that the bundles no longer stick together.

What is to be understood as a mechanically generated fluidized bed in the context of the invention, is explained below. A fluidized bed is usually produced by a gas stream flowing from the bottom through the loose material and thereby keeping it in suspension. In order to achieve this, the flow velocity of the gas has to exceed a particular threshold value (fluidization point). This threshold value is dependent, inter alia, on the density, size, distribution and shape of the particles of the loose material and the dimensions of the apparatus. Within the fluidized bed, the loose material behaves similarly to a boiling liquid, with the particles being in continual turbulent up and down motion. Particularly intensive heat and mass transfer between the particles therefore takes place in the fluidized bed.

However, the carbon fiber bundles tend to intermesh in a fluidized bed produced in this way and thereby form relatively large aggregates past which the gas stream flows.

However, it has been found that mechanical mixing tools, such as the blades of a mixing dryer, can generate a fluidized bed in which the fiber bundles do not intermesh and can be impregnated.

The process of the invention can be carried out by using all resins which are present in liquid form and can cure. In particular, use is made of resins which are carbonizable, i.e. form a residue consisting essentially of carbon upon heating under non-oxidizing conditions, for example phenolic resins and other thermosets.

For the purposes of the present invention, carbon fibers are all types of carbon fibers regardless of the starting material, but with polyacrylonitrile, pitch and cellulose fibers being the most widely used starting materials.

In the fiber bundles which are preferably used for the process of the invention, a carbonized binder holds the carbon fibers together. This prevents the fiber bundles from disintegrating during impregnation in the fluidized bed. Due to the volume reduction occurring upon carbonization of the binder, the fiber bundles are relatively open-pored and can therefore take up a relatively large amount of resin. The resin content of the impregnated fiber bundles which can be obtained by the process of the invention can be up to 35% of the initial mass of the fiber bundles.

Suitable processes for producing fiber bundles which have a defined length, width and thickness and include parallel carbon fibers which are held together by a carbonized binder, are disclosed in European Patent Application EP 1 645 671, corresponding to U.S. Patent Application Publication No. US 2006/076699.

A first variant of this process includes the following steps:
impregnation of at least one roving, including a plurality of parallel carbon fiber filaments, with a carbonizable binder so as to yield a prepreg,
pressing of at least one impregnated roving or a plurality of parallel impregnated rovings to form a laminate sheet including parallel filaments (unidirectional laminate, hereinafter referred to as UD laminate) and having a defined thickness, combined with curing of the binder by heat treatment so as to yield a dimensionally stable laminate sheet of defined thickness,
carbonization of the binder in the UD laminate sheet, and
cutting of the UD laminate sheet, which may have been separated into individual bands, to yield segments (fiber bundles) of defined width and length.

A second variant of the process includes the following steps:
impregnation of at least one roving, including a plurality of parallel carbon fiber filaments, with a carbonizable binder so as to yield a prepreg,
pressing of at least one impregnated roving or a plurality of parallel impregnated rovings to form a laminate sheet including parallel filaments (unidirectional laminate, hereinafter referred to as UD laminate) and having a defined thickness, combined with curing of the binder by heat treatment so as to yield a dimensionally stable laminate sheet of defined thickness,
cutting of the UD laminate sheet, which may have been separated into individual bands, to yield segments (fiber bundles) of defined width and length, and
carbonization of the binder in the fiber bundles.

The rovings are preferably fanned out before impregnation in order to aid in the parallel configuration of the fibers next to one another in the plane.

The binder content of the laminate in the prepreg state is from 25 to 48% by mass and depends on the impregnation conditions selected. The prepreg has a mass per unit area of from 20° to 500 g/m$^2$.

The prepreg, in the form of one or more impregnated rovings disposed side by side, is passed through rollers, a calender, a belt press or another suitable continuous pressing apparatus. In this pressing apparatus, the excess binder is preferably squeezed out of the rovings through the use of a plurality of gaps between the rollers which are disposed in series with decreasing gap width, and the rovings are pressed flat to such an extent that each roving includes no more than three superposed layers of fibers, preferably only one single layer of fibers, having substantially parallel filaments. The pressing of the prepreg is carried out in the hot state (at temperatures up to 200° C.), so that the carbonizable binder either cures fully or cures to at least such an extent that dimensionally stable rovings are obtained.

Cooling of the now flat rovings bonded by the cured binder is also preferably carried out in the pressing apparatus. After leaving the continuous pressing apparatus, a flat laminate sheet including parallel filaments (unidirectional laminate, hereinafter referred to as "UD laminate") and having a thickness of from 0.15 to 0.4 mm is obtained. In the first process variant, the carbonizable binder in the laminate sheet is carbonized. The carbonization is carried out in a known manner by heating to from 800 to 1000° C. under nonoxidizing conditions, i.e. under a protective gas atmosphere. The carbonization is preferably carried out continuously at a temperature of 900° C., i.e. the laminate sheet passes through the carbonization furnace. The advance rate of the laminate sheet and the dimensions of the furnace are to be matched to one another so that the residence time necessary for carbonization is achieved.

The laminate sheet can, if necessary, be divided up into bands having a width of from 20 to 60 mm to assist in handling.

These band-shaped UD laminates are then cut longitudinally into strips having widths which correspond to the desired width of the fiber bundles. This is preferably effected through the use of a cutting roller or a plurality of cutting rollers disposed side by side. It is also possible to cut the laminate sheet or the bands in the not yet fully cured state into strips through the use of wires stretched across the path of the band.

The strips are fed directly to a preferably continuously operated apparatus for cutting to length and cut into segments (fiber bundles) of the desired length. However, it is also possible to carry out the cutting to length in a process which is separate from the cutting of the strips and operates at a different speed. For this purpose, the strips which have been cut to the chosen width are wound up onto spools and transported to the apparatus for cutting to length. The continuous cutting of the strips to the desired length is preferably carried out through the use of a blade roller.

The fiber bundles obtained in this way have a defined, uniform length, width and thickness. The bundle thickness, i.e. the number of superposed layers of fibers, was set during pressing of the roving to form the laminate sheet. The bundle width, i.e. the dimension which is perpendicular to the fiber direction and is determined by the number of parallel fibers disposed side by side to one another, is set in the longitudinal cutting of the laminate sheet or bands to yield strips. The bundle length, i.e. the dimension in the fiber direction, is set by the cutting to length of the strips to yield segments (fiber bundles).

Bundles having the following dimensions are typically produced: thickness in the range from 0.15 to 0.4 mm, length in the range from 6 to 10 mm and width in the range from 0.5 to 3.5 mm. At least 90% of the fiber bundles produced in this way have a length which is in the range from 90 to 110% of the mean length and a width which is in the range from 90 to 110% of the mean width.

In the second process variant, the carbonizable binder in the fiber bundles is carbonized by heating the bundles to from 800 to 1000° C., preferably 900° C., under non-oxidizing conditions (protective gas atmosphere).

The fiber bundles, including parallel carbon fibers held together by a carbonized binder, which have been produced by the first or second process variant are, for the purposes of impregnation, subjected to a mechanically generated fluidized bed and in this state preheated to a temperature sufficient for curing or drying of the impregnation resin. This temperature is usually in the range from 130 to 150° C., at most 200° C. After addition of the impregnation resin, the fiber bundles are kept in the fluidized bed until the resin has been cured or at least dried so that they can no longer stick together.

In order to generate the fluidized bed, it is possible, for example, to use a heatable mixing dryer equipped with blades. The bundles are preferably preheated to the curing or drying temperature of the resin at a relatively low rotational speed to avoid damage to the fiber bundles. The liquid resin is sprayed into the fluidized bed or introduced through the use of a metering port provided on the mixer. The amount of resin added depends on the desired resin content of the fiber bundles to be impregnated. A resin content of up to 35% of the initial mass of the fiber bundles can be achieved in the fiber bundles through the use of the impregnation process of the invention.

The rotational speed is preferably increased briefly during addition of the resin and reduced again after a short phase of intensive mixing. Due to the low bulk density (180 to 280 kg/m$^3$) of the fiber bundles held together by a carbonized binder, intensive three-dimensional mixing of fiber bundles and impregnation resin can be achieved even at relatively low rotational speeds (and therefore low shear forces). Thus, damage to the fiber bundles by excessively high shear forces in the fluidized bed can be avoided.

Rotational speeds of from 30 to 60 per min (30-60 rotations per minute) have been found to be particularly suitable for the heating-up phase and the drying phase, and these can be increased briefly to up to 100 per min for the mixing phase. If the process is characterized by the dimensionless Froude number (ratio of inertial force to the force of gravity, proportional to the square of the rotational speed and the diameter of the mixer), the preferred procedure is as follows: preheating and drying of the fiber bundles at a Froude number below 1, and addition and mixing-in of the impregnation resin while briefly increasing the Froude number to values in the range from 1.5 to 4, preferably not more than 2.5.

The preheating of the fiber bundles in the fluidized bed is typically carried out over a period of from 5 to 10 minutes (depending on initial temperature and target temperature), the mixing-in of the impregnation resin at an increased rotational speed typically takes from 1 to 3 minutes and not more than 5 minutes and the curing or drying of the impregnated fiber bundles typically takes a period of at least 5 minutes.

In order to keep the heating-up time short and avoid stress on the fiber bundles, heating-up should be carried out at a high heating rate.

In order to avoid adhesion of material, the interior wall and the blades of the mixer can be treated with a release agent.

The resin fed into the fluidized bed is taken up virtually quantitatively by the fiber bundles. It is possible to produce impregnated fiber bundles having a resin content of up to 30%, preferably up to 35%, of the initial mass of the fiber bundles. The impregnation resin envelops the carbon fibers in the bundles and fills the hollow spaces formed during pyrolysis of the carbonizable binder. This mechanically stabilizes the fiber bundles. Within the bundles, the fibers are held together by the cured impregnation resin, so that the bundles cannot disintegrate during further processing and the fibers are fixed in their parallel spatial configuration in the bundles.

The impregnated fiber bundles can be poured and are free-flowing and can easily be mixed with other components to yield relatively homogeneous molding compositions. As a result of the cured binder in the fiber bundles, which holds together the parallel fibers located side by side to one another, the fiber bundles do not break up upon mixing into the molding composition. This ensures that the fiber bundles in the molding composition have a largely uniform defined length, width and thickness.

The molding composition typically includes a carbonizable matrix former in addition to the fiber bundles which have been impregnated according to the invention.

For the purposes of the present invention, a carbonizable matrix former is a carbon-containing polymeric material, for example a resin, which upon heating in a non-oxidizing atmosphere forms a pyrolysis residue consisting essentially of carbon. The carbonizable matrix former can be present as a pulverulent dry resin or as a wet resin. Phenolic resins are particularly suitable as matrix formers. The proportion by mass of the fiber bundles in the molding composition is from 70 to 80%.

If required, auxiliaries such as silicon carbide for improving the tribological properties and oxidation inhibitors such as zirconium carbide, tantalum carbide or tantalum boride which inhibit oxidative attack upon exposure to oxygen by glass formation, can be mixed into the molding composition. The total proportion by mass of auxiliaries in the molding composition is not more than 10%.

Molding compositions including the carbon fiber bundles which have been impregnated according to the invention, carbonizable matrix formers and, if appropriate, auxiliaries, can be used to produce green bodies which are subsequently carbonized or carbonized and graphitized so as to yield shaped bodies having a carbon fiber reinforced carbon matrix.

These shaped bodies can be used directly, if appropriate after re-impregnation with subsequent carbonization and/or re-densification through the use of vapor infiltration of carbon. However, because the fiber bundles have already been densified by impregnation in the fluidized bed, the need for re-densification is less for carbon fiber reinforced carbon bodies which have been produced by using the fiber bundles which have been impregnated according to the invention than for carbon bodies having fiber bundles which have not been impregnated.

Alternatively, the shaped bodies having a carbon fiber reinforced carbon matrix can be used as intermediate bodies for producing carbon fiber reinforced silicon carbide (C/SiC). In these intermediate bodies, the carbon fibers in the fiber bundles which have been impregnated according to the invention are surrounded by an envelope of the carbonization residues of the resin impregnation and thus protected against reactive attack by the infiltrated silicon. This ensures that the reinforcing function of the carbon fibers is maintained even after silicization. The silicization of the intermediate bodies is carried out in a known manner by infiltration with liquid silicon.

Other features which are considered as characteristic for the invention are set forth in the appended claims.

Although the invention is described herein as embodied in a process for the impregnation of carbon fiber bundles, a resin-impregnated carbon fiber bundle, a shaped body and an intermediate body for silicization, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENT EXAMPLES

Referring now in detail to an example of the invention, the production of bundles of carbon fibers held together by a carbonized binder was carried out according to the second variant of the above-described process, i.e. bundles having the desired dimensions were cut from a laminate sheet which had been pressed to the desired thickness and were then carbonized at 900° C. The fiber bundles had a length of 9 mm, a width of 1 mm and a thickness of 0.2 mm.

Impregnation was carried out in a heatable mixing dryer which was equipped with ETS® blades. The fiber bundles were subjected to a fluidized bed having a Froude number of from 0.7 to 0.8 and preheated to a temperature of 130° C. This was reached after 5-10 minutes. A liquid phenolic resin was then introduced in an amount of 30% of the initial mass of the fiber bundles. For the introduction of resin, the Froude number was increased to a value of 2 and maintained at this higher value for from 1 to 3 minutes. The Froude number was then reduced again to 0.7-0.8 and the fiber bundles were kept in the fluidized bed for a further 5-7 minutes. During this time, the mixer was no longer heated so that the fiber bundles could cool down to temperatures in the range from 95 to 115° C.

In further experiments, the Froude number was increased to values up to 4 for the mixing phase under otherwise identical conditions.

The liquid resin was always taken up completely by the fiber bundles. In the material taken from the mixer after drying, the fiber bundles were not stuck together, i.e. free-flowing impregnated fiber bundles were obtained. Damage to the fiber bundles by the shear forces acting in the mixer was not observed.

We claim:

1. A process for the impregnation of free-flowing bundles of carbon fibers with a curable resin present in liquid form, the process comprising the following steps:
    providing parallel carbon fibers;
    providing a bundle thickness having a value in a range from 0.15 to 0.4 mm, a bundle length having a value in a range from 6 to 15 mm, and a bundle width having a value in a range from 0.5 to 3.5 mm;
    keeping the free-flowing carbon fiber bundles in a mechanically generated fluidized bed during impregnation with the curable resin; and
    providing a carbonized binder for holding the carbon fibers together in the free-flowing carbon fiber bundles;
    keeping the free-flowing carbon fiber bundles in the fluidized bed until the resin has been cured or at least dried in filled pores, of the free-flowing carbon fiber bundles, formed during carbonization of the binder, so that the bundles no longer stick together.

2. The process according to claim 1, which further comprises keeping the carbon fiber bundles in the mechanically generated fluidized bed during the following phases:
    a preheating phase in which the carbon fiber bundles are heated to a temperature sufficient for curing or drying of the impregnation resin,
    a mixing phase commencing with the addition of the impregnation resin to the carbon fiber bundles, and
    a curing or drying phase during which the impregnation resin in the fiber bundles cures or dries.

3. The process according to claim 2, which further comprises preheating the carbon fiber bundles to a temperature of at least 130° C.

4. The process according to claim 2, wherein:
    the heating-up phase has a duration of from 5 to 10 minutes,
    the mixing phase has a duration of from 1 to 5 minutes, and
    the curing or drying phase has a duration of at least 5 minutes.

5. The process according to claim 4, wherein the mixing phase has a duration of not more than 3 minutes.

6. The process according to claim 2, which further comprises generating the fluidized bed with a mixing dryer.

7. The process according to claim 6, wherein the mixing dryer is equipped with blades.

8. The process according to claim 6, which further comprises setting a rotational speed of the mixing dryer to from 30 to 60 rotations per minute during the preheating phase and during the curing or drying phase, and increasing the rotational speed of the mixer to up to 100 rotations per minute during the mixing phase.

9. The process according to claim 6, which further comprises setting a Froude number to less than 1 during the preheating phase and during the curing or drying phase, and increasing the Froude number to from 1.5 to 4 during the mixing phase.

10. The process according to claim 9, which further comprises increasing the Froude number to not more than 2.5 during the mixing phase.

11. The process according to claim 1, wherein the resin is a phenolic resin or another carbonizable resin.

12. The process according to claim 1, wherein the carbon fiber bundles take up an amount of resin of up to 35% of an initial mass of the carbon fiber bundles.

13. The process according to claim 1, wherein the carbon fibers in the fiber bundles to be impregnated are held together by a carbonized binder.

14. The process according to claim 13, which further comprises producing the carbon fiber bundles held together by the carbonized binder by the following steps:
    impregnation of at least one roving including a plurality of parallel carbon fiber filaments with a carbonizable binder so as to yield a prepreg,
    pressing of at least one impregnated roving or a plurality of parallel impregnated rovings to form a unidirectional laminate sheet including parallel filaments and having a defined thickness, combined with curing of the binder by heat treatment so as to yield a dimensionally stable laminate sheet of defined thickness,
    carbonization of the binder in the unidirectional laminate sheet, and
    cutting of the unidirectional laminate sheet, which may have been separated into individual bands, to yield segments or fiber bundles of defined width and length.

15. The process according to claim 13, which further comprises producing the carbon fiber bundles held together by the carbonized binder by the following steps:
   impregnation of at least one roving including a plurality of parallel carbon fiber filaments with a carbonizable binder so as to yield a prepreg,
   pressing of at least one impregnated roving or a plurality of parallel impregnated rovings to form a uni-directional laminate sheet including parallel filaments and having a defined thickness, combined with curing of the binder by heat treatment so as to yield a dimensionally stable laminate sheet of defined thickness,
   cutting of the unidirectional laminate sheet, which may have been separated into individual bands, to yield segments or fiber bundles of defined width and length, and carbonization of the binder in the fiber bundles.

16. The process according to claim 14, which further comprises setting a thickness of the fiber bundles to a value in a range from 0.15 to 0.4 mm, setting a length of the fiber bundles to a value in a range from 6 to 15 mm, and setting a width of the fiber bundles to a value in a range from 0.5 to 3.5 mm.

17. The process according to claim 15, which further comprises setting a thickness of the fiber bundles to a value in a range from 0.15 to 0.4 mm, setting a length of the fiber bundles to a value in a range from 6 to 15 mm, and setting a width of the fiber bundles to a value in a range from 0.5 to 3.5 mm.

18. A free flowing resin-impregnated carbon fiber bundle, comprising:
   parallel carbon fibers in the free-flowing resin-impregnated carbon fiber bundle;
   a bundle thickness having a value in a range from 0.15 to 0.4 mm, a bundle length having a value in a range from 6 to 15 mm, and a bundle width having a value in a range from 0.5 to 3.5 mm
   a carbonized binder holding said carbon fibers together in the free-flowing resin-impregnated carbon fiber bundle; and
   cured impregnation resin filled into pores, of the free-flowing resin-impregnated carbon fiber bundle, formed during carbonization of the binder.

19. The carbon fiber bundle according to claim 18, wherein said resin is a phenolic resin or another carbonizable resin.

20. The carbon fiber bundle according to claim 18, wherein an amount of said resin taken up by the carbon fiber bundle is up to 35% of an initial mass of the carbon fiber bundle.

21. A shaped body, comprising:
   carbon fiber bundles according to claim 19; and
   a carbon matrix reinforced with said carbon fiber bundles.

22. An intermediate body for silicization, the intermediate body comprising:
   carbon fiber bundles according to claim 19; and
   a carbon matrix reinforced with said carbon fiber bundles.

* * * * *